Patented Aug. 27, 1935

2,012,772

UNITED STATES PATENT OFFICE 2,012,772

MONOAZO DYESTUFFS AND THEIR PRODUCTION

Bernhard Richard, Basel, Switzerland, assignor to the firm of J. R. Geigy A. G., Basel, Switzerland No Drawing. Application January 6, 1934, Serial No. 705,615. In Germany January 23, 1933

8 Claims. (Cl. 260—87)

By this invention valuable dyestuffs which dye wool and silk yellow shades are made by coupling the diazo compound of an amine of one of the following general formulæ:

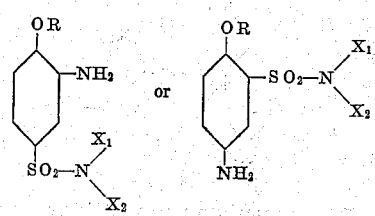

(wherein R represents an aromatic radical and $X_1$ and $X_2$ represent hydrogen or the same or different aliphatic, araliphatic or aromatic radicals) with a pyrazolone sulphonic acid.

The new dyestuffs so obtained dye wool and silk yellow shades having very good properties of fastness; they excel the dyestuffs of German specifications No. 220,722, No. 226,239, No. 228,794, No. 543,230 and No. 543,590 in respect of their fastness to fulling, to sea-water and to perspiration, as well as in their good capacity for being absorbed from a neutral dye-bath containing sodium sulphate.

The following examples illustrate the invention:—

Example 1

A diazo solution prepared by diazotizing 36.8 kilos of 2-amino-diphenylether-4-sulphonic acid N-ethylanilide is allowed to run into a solution of 25.5 kilos of para-sulpho-phenyl-3-methyl-5-pyrazolone containing sodium acetate. The whole is neutralized by the gradual addition of a solution of sodium carbonate and the dyestuff is worked up in the usual manner.

The dyestuff so obtained is a reddish-yellow powder soluble both in water and in concentrated sulphuric acid to yellow solutions. It dyes wool and silk reddish-yellow shades having very good fastness properties.

If instead of the pyrazolone derivative used in this example there is used meta-sulphophenyl-3-methyl-5-pyrazolone or a chloro- or dichlorosulphophenyl-methyl-pyrazolone, there are likewise obtained dyestuffs which dye wool and silk reddish-yellow to greenish-yellow shades having equally good fastness properties.

Example 2

A diazo solution is prepared from 36.8 kilos of 4-amino-diphenyl-ether-2-sulphonic acid N-ethylanilide, a white crystalline product of melting point 86–87° C. which can be obtained by causing 4-nitro-1-chlorobenzene-2-sulphonic acid chloride to react with mono-ethylaniline, condensing with sodium phenolate the 4-nitro-1-chlorobenzene-2-sulphonic acid N-ethylanilide thus formed and then reducing the condensation product by means of iron. The diazo solution is allowed to run into an aqueous solution of 29 kilos of 1-(2'-chloro-5'-sulphophenyl)-3-methyl-5-pyrazolone containing an excess of sodium acetate. The whole is neutralized by the gradual addition of a solution of sodium carbonate and when coupling is finished the dyestuff is worked up in the customary manner. The dyestuff so obtained is a greenish-yellow powder and dyes wool and silk greenish-yellow shades having remarkable fastness properties.

It will be understood that the invention is not limited to the production of the dyestuffs described in the foregoing examples. For instance, there may be used in carrying out the invention the diazo compounds of the following amines:—

2-amino-diphenylether-4-sulphonic acid - N - amide 2-aminodiphenylether-4-sulphonic acid-N-dimethylamide 2-aminodiphenylether-4-sulphonic acid-N-anilide 2-aminodiphenylether-4-sulphonic acid-N-o-toluidide 2-amino-2'-methyldiphenylether-4-sulphonic acid-N-anilide 2 - amino - 4' - chlordiphenylether-4-sulphonic acid-N-ethylanilide 2-aminodiphenylether-4-sulphonic acid-N-benzylphenylamide 2-aminodiphenylether-4-sulphonic acid-N-methylbenzylamide 4-aminodiphenylether-2-sulphonic acid-N-anilide 4-amino-2'-methyldiphenylether-2-sulphonic acid-N-ethylanilide 4-aminodiphenylether-2-sulphonic acid-N-benzylphenylamide 4-aminodiphenylether-2-sulphonic acid-N-dimethylamide Also instead of the pyrazolone sulphonic acid used in the examples there may be used without appreciable variation in the result a series of other pyrazolone sulphonic acids for example:

1-(4'-methyl-2'-sulphophenyl)-3-methyl-5-pyrazolone 1-(2'-chloro-4'-sulphophenyl)-3-methyl-5-pyrazolone 1-(4'-chloro-2'-sulphophenyl)-3-methyl-5-pyrazolone 1-(2',5'-dichloro-4'-sulphophenyl)-3-methyl-5-pyrazolone 1-(2',5'-dichloro-4'-sulphophenyl)-5-pyrazolone-3-carboxylic acid 1-(2'-chloro-5'-sulphophenyl)-5-pyrazolone-3-carboxylic acid ester.

What I claim is:—

1. A process for the manufacture of monoazo dyestuffs, consisting in coupling the diazo compound of an amine of the following general formula:

wherein one Z is an $NH_2$-group and the other Z a

group and wherein R represents an aromatic radical of the benzene series, whilst $X_1$ represents hydrogen or an aliphatic radical and $X_2$ represents hydrogen, an aliphatic radical, an aralkyl or an aryl radical of the benzene series, with a pyrazolone sulphonic acid.

2. A process for the manufacture of monoazo dyestuffs, consisting in coupling the diazo compound of an amine of the following general formula:

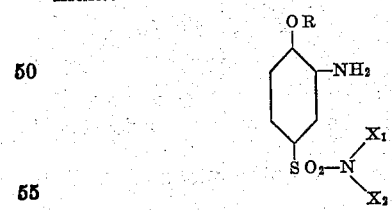

wherein R represents an aromatic radical of the benzene series, $X_1$ represents hydrogen or an aliphatic radical and $X_2$ represents hydrogen, an aliphatic radical, an aralkyl or an aryl radical of the benzene series, with a pyrazolone sulphonic acid.

3. A process for the manufacture of monoazo dyestuffs, consisting in coupling the diazo compound of an amine of the following general formula:

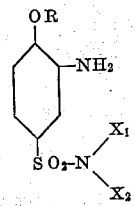

wherein R represents an aromatic radical of the benzene series, $X_1$ represents hydrogen or an aliphatic radical and $X_2$ represents hydrogen, an aliphatic radical, an aralkyl or an aryl radical of the benzene series, with an alkylester of a pyrazolone carboxylic-sulphonic acid.

4. A process for the manufacture of monoazo dyestuffs, consisting in coupling the diazo compound of an amine of the following general formula:

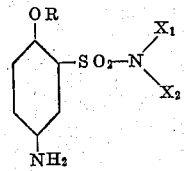

wherein R represents an aromatic radical of the benzene series, $X_1$ represents hydrogen or an aliphatic radical and $X_2$ represents hydrogen, an aliphatic radical, an aralkyl or an aryl radical of the benzene series, with a pyrazolone sulphonic acid.

5. Monoazo dyestuffs dyeing wool and silk yellow shades, prepared according to the process of claim 1.

6. Monoazo dyestuffs dyeing wool and silk yellow shades, prepared according to the process of claim 2.

7. Monoazo dyestuffs dyeing wool and silk yellow shades, prepared according to the process of claim 3.

8. Monoazo dyestuffs dyeing wool and silk yellow shades, prepared according to the process of claim 4.

BERNHARD RICHARD.